United States Patent [19]
Devenyi

[11] Patent Number: 5,515,210
[45] Date of Patent: May 7, 1996

[54] PERMANENT MAGNETIC SUSPENSION WITH ROLLER GUIDES

[75] Inventor: Gabor Devenyi, Ontario, Canada

[73] Assignee: Hughes Aircraft Company, Los Angeles, Calif.

[21] Appl. No.: 45,958

[22] Filed: Apr. 12, 1993

[51] Int. Cl.$^6$ .............................. G02B 7/02; G02B 15/14
[52] U.S. Cl. ............................ 359/823; 359/694; 359/703
[58] Field of Search ..................................... 359/694, 696, 359/697, 702, 703, 813, 814, 823, 824, 92; 310/179–189, 193, 194

[56] References Cited

U.S. PATENT DOCUMENTS

| | | | |
|---|---|---|---|
| 4,676,605 | 6/1987 | Toda et al. | 359/696 |
| 4,740,064 | 4/1988 | Kono et al. | 359/697 |
| 5,182,481 | 1/1993 | Sakamoto | 359/824 |
| 5,272,567 | 12/1993 | Inoue | 358/698 |
| 5,289,318 | 2/1994 | Sekine et al. | 359/873 |
| 5,301,066 | 4/1994 | Higuchi et al. | 359/698 |

FOREIGN PATENT DOCUMENTS 122506  7/1983  Japan ..................................... 359/824

Primary Examiner—Thong Q. Nguyen
Attorney, Agent, or Firm—Michael W. Sales; Wanda K. Denson-Low

[57] ABSTRACT

A lens assembly for positioning on a guide rod 4 has a lens cell 10 and a permanent magnet assembly 12 connected to the lens cell 10. The permanent magnet assembly 12 has a permanent magnet 20 for applying a close-coupled magnetic force on the guide rod 4 to hold the lens cell 10 at a desired position along the guide rod 4. The permanent magnet 20 is V-shaped with a north pole, a south pole, and a recessed longitudinal channel in-between for receiving the guide rod 4 in close proximity. The magnet 20 also has a plurality of rotational guide bearings 22, 24, 26, 28, each rolling against an underside of the guide rod 4 to guide the lens cell as it is moved along the guide rod. The permanent magnet assembly 12 also has an aperture 30 therein in which the guide rod passes through to secure the lens assembly 2 from releasing from the guide rod when shock loading exceeds the close-coupled magnetic attraction force.

9 Claims, 2 Drawing Sheets

PERMANENT MAGNETIC SUSPENSION WITH ROLLER GUIDES

BACKGROUND OF THE INVENTION

1. Field of the Invention

The present invention generally relates to a lens which is movably positioned along a guide rod, and in particular relates to a movably positioned lens having magnetic means for holding it in place on the guide rod.

2. Description of the Prior Art

Conventional guidance assemblies for optical or mechanical devices include guide rods and re-circulating linear ball bearings which must be heavily pre-loaded to provide precision play-free guidance. This results in high cost, requires high accuracy between mating pans, and includes relatively bulky components.

Further, relatively high drive forces are typically needed to move the pre-loaded components. Such pre-loads are susceptible to change with temperature.

In one typical use, a guidance assembly supports a lens for filming motion pictures which requires exceptionally accurate positioning to ensure very sharp images to film a master tape (from which all future tapes will be copied). The filming of a motion picture may subject the guidance assembly to extreme temperature variations, such as those in a desert or mountainous climate. The extreme temperature variations may cause difficulty in positioning the lens assembly and may cause movement due to expansion and contraction in a pre-positioned lens assembly.

SUMMARY OF THE INVENTION

According to the invention, a lens assembly for slidably positioning on a guide rod is provided having a lens cell; and a permanent magnet assembly connected to the lens cell, having a permanent magnet for applying a close-coupled magnetic force on the guide rod to hold the lens assembly at a desired position along the guide rod.

In one embodiment, the permanent magnet assembly has a plurality of rotational guide bearings, for guiding the lens cell as it is moved along the guide rod.

In still another embodiment, the permanent magnet assembly has an aperture therein through which the guide rod passes to protect the lens assembly from falling off the guide rod when shock loading may exceed the closed-coupled magnetic attraction force.

The invention provides accurate guidance to moving mechanical assemblies (e.g. moving elements in a zoom lens) while maintaining low resistance to the drive forces in the direction of motion.

The invention provides a reliable and accurate guidance under extreme temperature variations by employing permanent magnetic attraction unchanged by lubricants or other physical conditions.

The invention applies to electronic zoom lens. It also applies to any optomechanical, electro-mechanical or like devices where reliable athermal guidance is Other objects and advantages of the present invention will become apparent to those skilled in the art from the following detailed description of the invention when read in conjunction with the appended claims and drawing attached hereto.

DETAILED DESCRIPTION OF THE INVENTION

Figure 1:
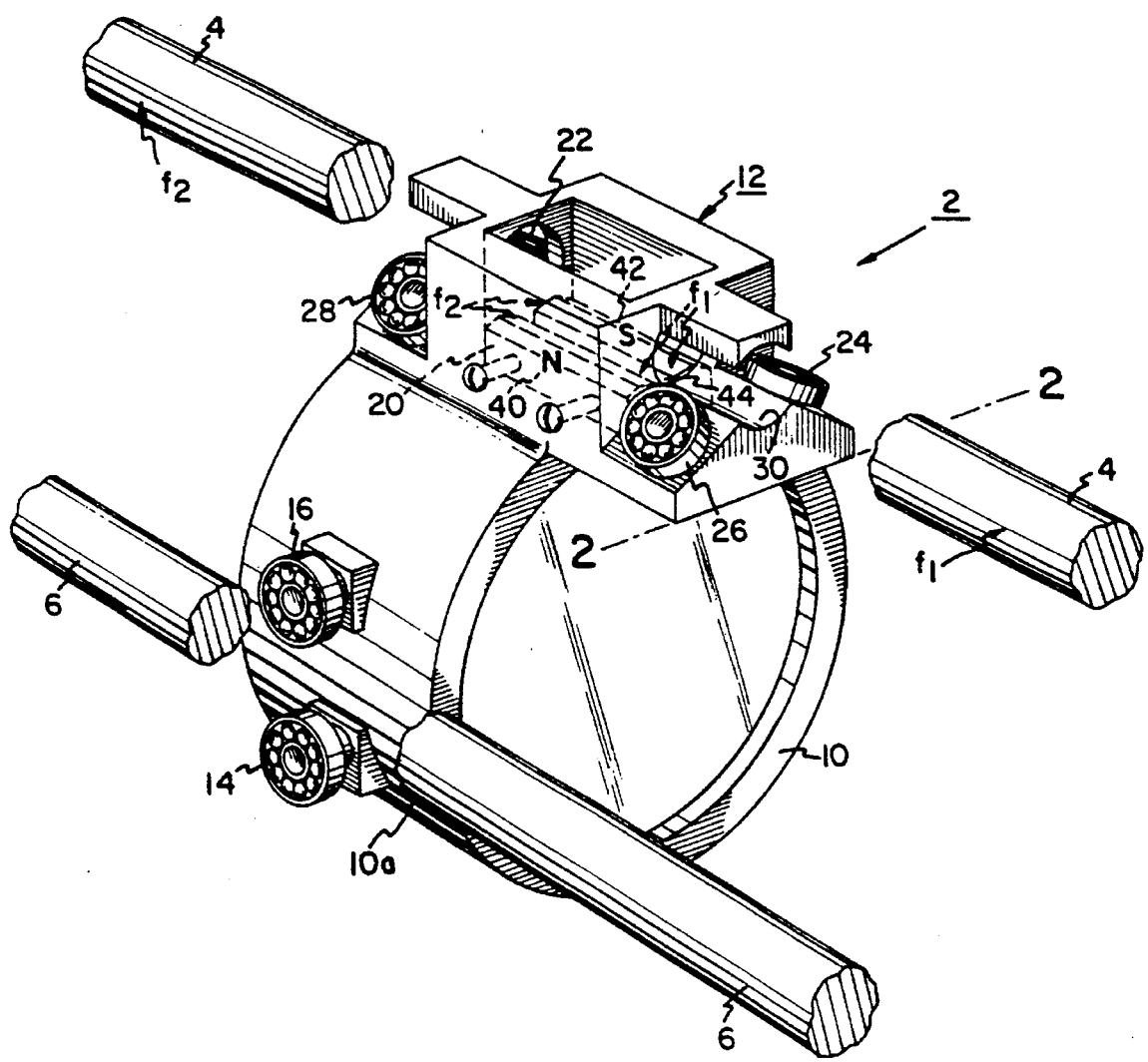
FIG. 1, not drawn to scale, shows a movable lens arranged on guide rods according to the present invention.

FIG. 1 shows a movable lens assembly 2 arranged on guide rods 4 and 6. In one embodiment, the guide rods 4 and 6 are two hardened steel rods.

The movable lens assembly 2 includes a lens cell 10 having a perimeter 10a with a permanent magnet assembly 12 arranged thereon at the top of the lens cell 10 as shown. A pre-load bearing 14 and guide beating 16 are also arranged on the perimeter 10a of the lens cell 10 at a 90° angle with respect to the permanent magnetic assembly 12. The pre-load beating 14 and guide beating 16 cooperate with the guide rod 6 to further support and position the lens cell 10 along the guide rod 4.

Figure 2:
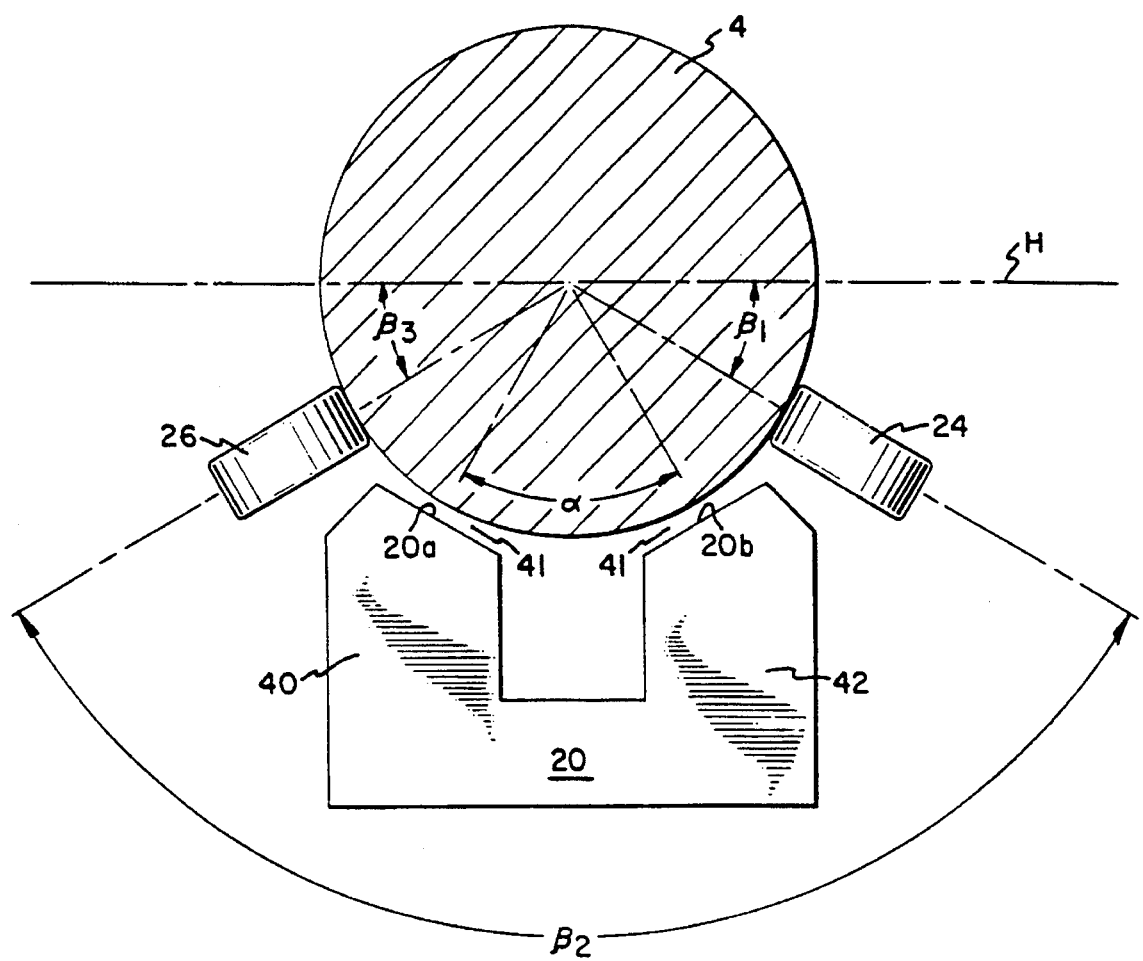
FIG. 2, not drawn to scale, shows a cross-sectional view of the guide rod and the permanent magnetic assembly along lines 2—2 in FIG. 1.

The permanent magnet assembly 12 has a permanent magnet 20 which provides a closed-coupled attractive magnetic force to support the lens assembly 2 to the guide rod 4. Magnetic force lines f1 and f2 illustrate the magnetic force applied to the guide rod 4 as a close-coupled attractive magnetic force. The permanent magnet 20, in the embodiment, is U-shaped, having a north pole 40 and a south pole 42, and having a V-shaped recessed longitudinal channel 44 placed in close proximity to the guide rod 4 on the permanent magnet assembly 12 to attract the guide rod and hold it against the ball bearings. The north pole 40 and south pole 42 are disposed parallel to and spaced apart from each other and also parallel to a lengthwise axis (not shown) of guide rod 4. As shown in FIG. 2, the north pole 40 and south pole 42 are disposed about the guide rod 4 with a small air gap or clearance 41, at an arc segment of $\alpha$. In a preferred embodiment, $\alpha$ equals 60°.

The permanent magnet assembly 12 in the preferred embodiment has four ball bearings 22, 24, 26 and 28 arranged in a V-shaped configuration on each side of the permanent magnet assembly 12, as shown. The four ball bearings 22, 24, 26 and 28 provide guidance for the lens cell 10 by rolling against the underside of the guide rod 4. The four ball bearings 22, 24, 26 and 28 provide all supportive and guiding functions. As shown in FIG. 2, the rotational guide beatings 24 and 26 are disposed about the guide rod, and contact it at an arc segment of $\beta_1$ and $\beta_3$ respectively with respect to the horizontal plane H of the guide rod 4, as shown. In a preferred embodiment, $\beta_1$ and $\beta_3=30°$ and $\beta_2$ equals 120°.

Preferably, the lens cell 10 is secured against shock loads that may exceed the close-coupled magnetic attraction forces f1 and f2 by means of a clearance aperture 30 passing through the permanent magnet assembly 12. The aperture 30 helps to prevent lens cell 10 from breaking if the permanent magnet 20 releases the guide rod 4 in the event shock loading exceeds the close-coupled magnetic force. The guide rod 4 is thus surrounded by the rest of the assembly 12 to retain the guide rod 4 and to prevent the lens from falling off the guide rod 4.

In the embodiment, additional guidance must be provided by the pair of bearings 14 and 16 which cooperate with a second guide rod 6 in order to control rotation of the assembly out of the optical axes. The guide bearing 16 is mounted on a rigid shaft (not shown), and the pre-load bearing 14 is mounted on two spring rods (not shown) to provide pre-loading. The above-described system is "space efficient" and easily adaptable to different design applications.

The aforementioned embodiments described admirably achieve the objects of the invention; however, it will be appreciated that departures can be made by those skilled in the art without departing from the spirit and scope of the invention which is limited only to the following claims and reasonable interpretation thereof.

What is claimed is:

1. A lens assembly for positioning along a guide rod, comprising:

a lens cell;

a permanent magnet assembly connected to the lens cell and having a permanent magnet juxtaposed in close spatial relationship to the guide rod for applying a close-coupled magnetic force on the guide rod to hold the lens cell at a desired position along the guide rod, and a plurality of rotational guide bearings, each being disposed about the guide rod for supporting the guide rod and guiding the lens assembly along the guide rod.

2. A lens assembly according to claim 1, wherein the permanent magnet has a north pole and a south pole disposed parallel to and spaced apart from each other and parallel to a length wise axis of the guide rod.

3. A lens assembly according to claim 2, wherein the permanent magnet is U-shaped.

4. A lens assembly according to claim 2, wherein the north and south poles form a longitudinal channel which is V-shaped.

5. A lens assembly according to claim 2, wherein the north pole and south pole attracts the guide rod at an arc segment of about 60°.

6. A lens assembly according to claim 1, wherein the rotational guide bearings contact the guide rod at an arc segment of about 120° with respect to an horizontal plane H of the guide rod.

7. A lens assembly according to claim 1, wherein the permanent magnet assembly has a longitudinal clearance aperture for the guide rod to pass through for preventing the lens cell from breaking if the permanent magnet releases the guide rod in the event shock loading exceeds the closed-coupled magnetic force.

8. A lens assembly according to claim 1, wherein the plurality of rotational guide bearings include a first pair of bearings for guiding a first guide rod and a second pair of bearings for guiding a second rod.

9. Apparatus for positioning along a guide rod, comprising:

first assembly means to be positioned along the guide rod;

a permanent magnet assembly connected to the first assembly means, having a permanent magnet juxtaposed in close spatial relationship to the guide rod for applying a close-coupled magnetic force on the guide rod to hold the first assembly means at a desired position along the guide rod; and guide means comprising rotational bearings disposed about the guide rod for supporting the guide rod and guiding the first assembly along the guide rod.

* * * * *

UNITED STATES PATENT AND TRADEMARK OFFICE
CERTIFICATE OF CORRECTION

PATENT NO. : 5,515,210
DATED : May 7, 1996
INVENTOR(S) : Gabor Devenyi

It is certified that error appears in the above-identified patent and that said Letters Patent is hereby corrected as shown below:

Col. 1, line 62, insert --needed.-- after "is".

Col. 2, lines 18 and 21, delete "beating" and insert --bearing--.

Col. 2, line 50, delete "beatings" and insert --bearings--.

Signed and Sealed this

Twenty-second Day of October, 1996

Attest:

BRUCE LEHMAN

Attesting Officer    Commissioner of Patents and Trademarks